US009116821B2

(12) United States Patent
Scragg, Jr. et al.

(10) Patent No.: US 9,116,821 B2
(45) Date of Patent: *Aug. 25, 2015

(54) METHOD AND SYSTEM FOR USB DEVICE VIRTUALIZATION

(75) Inventors: Anthony K. Scragg, Jr., Coconut Creek, FL (US); Craig S. Siegman, Pembroke Pines, FL (US); Michael Straub, Boca Raton, FL (US)

(73) Assignee: Avocent Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/069,726

(22) Filed: Mar. 23, 2011

(65) Prior Publication Data

US 2012/0246359 A1    Sep. 27, 2012

(51) Int. Cl.
G06F 13/00 (2006.01)
G06F 3/00 (2006.01)
G06F 13/10 (2006.01)

(52) U.S. Cl.
CPC ...................................... *G06F 13/10* (2013.01)

(58) Field of Classification Search
None
See application file for complete search history.

(56) References Cited

U.S. PATENT DOCUMENTS

| | | | |
|---|---|---|---|
| 5,300,949 A | 4/1994 | Rodriquez et al. | |
| 5,379,071 A | 1/1995 | Parikh et al. | |
| 6,088,395 A | 7/2000 | Wang et al. | |
| 6,571,305 B1 * | 5/2003 | Engler | 710/100 |
| 7,478,180 B1 * | 1/2009 | Li | 710/62 |
| 7,640,382 B2 * | 12/2009 | Blackwell et al. | 710/74 |
| 2005/0182883 A1 * | 8/2005 | Overtoom | 710/305 |
| 2005/0240685 A1 * | 10/2005 | Keys | 710/8 |
| 2007/0011374 A1 * | 1/2007 | Kumar et al. | 710/105 |
| 2007/0174033 A1 * | 7/2007 | Huang et al. | 703/24 |
| 2008/0005446 A1 * | 1/2008 | Frantz et al. | 710/313 |
| 2008/0028120 A1 * | 1/2008 | McLeod | 710/313 |
| 2008/0071950 A1 * | 3/2008 | Justice | 710/100 |
| 2008/0147909 A1 | 6/2008 | Zhang | |
| 2008/0168118 A1 * | 7/2008 | Hickey et al. | 709/201 |
| 2008/0218581 A1 * | 9/2008 | Tsai | 348/14.04 |
| 2009/0204965 A1 * | 8/2009 | Tanaka et al. | 718/1 |
| 2009/0327418 A1 * | 12/2009 | Zhang et al. | 709/204 |
| 2010/0327059 A1 | 12/2010 | Dean | |
| 2011/0119666 A1 * | 5/2011 | Flynn | 718/1 |
| 2011/0161482 A1 * | 6/2011 | Bonola et al. | 709/223 |

OTHER PUBLICATIONS

"Virtualization". Dictionary.com definition. Vied Apr. 1, 2014. Available: http://dictionary.reference.com/browse/virtualization?s=t.*

(Continued)

*Primary Examiner* — Michael Sun
(74) *Attorney, Agent, or Firm* — Davidson Berquist Jackson & Gowdey LLP

(57) ABSTRACT

Methods and systems are provided to allow personal computer users to virtualize a local USB device so that they can remotely connect to a server and interact with the server as if the local USB device was physically connected to the server. They connect a remote USB target hardware device to the target system through a physical USB connection, and the device interacts with the local user's computer over a network. The target system is unaware that the USB device is not connected directly to the system through a physical connection, and the target system does not need special software to implement the remote USB device. The USB target hardware device connected to the target computer may be physically connected and disconnected.

18 Claims, 4 Drawing Sheets

(56) References Cited

OTHER PUBLICATIONS

"Virtualization". Wikipedia, the free encyclopedia. Viewed Apr. 1, 2014. Available: http://en.wikipedia.org/wiki/Virtualization.*
CN Appln. No. 201220113443.8—Aug. 22, 2012 SIPO Office Action with English translation.
International Search Report and Written Opinion mailed May 23, 2012 in PCT/US2012/028443.
CN Appln. No. 201220113511.0—Aug. 8, 2012 SIPO Office Action.
CN Appln. No. 201080024001 Dec. 4, 2013 Office Action w/English translation.
U.S. Appl. No. 13/070,175—Apr. 3, 2014 PTO Office Action.
CN 201080024001.X—Decision on Rejection issued Jan. 12, 2015.
EP Appln. No. 12760326.4—Supplemental Search Report mailed Oct. 24, 2014.

* cited by examiner

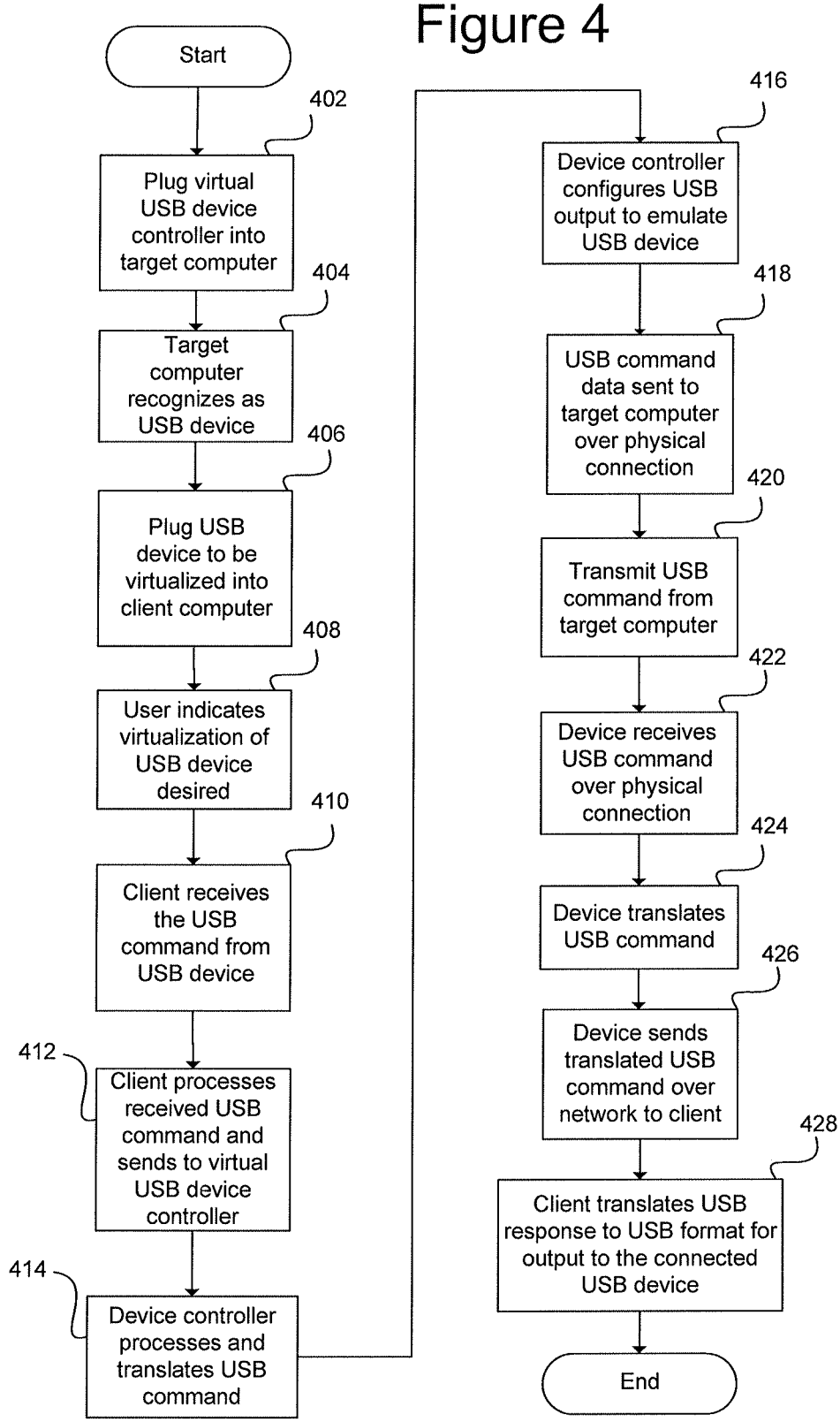

METHOD AND SYSTEM FOR USB DEVICE VIRTUALIZATION

This application is related to U.S. patent application Ser. No. 12/458,086, entitled "Method and System for Smart Card Virtualization," and U.S. patent application Ser. No. 13/070,175, entitled "Method and System for Audio Device Virtualization," which are hereby incorporated by reference.

FIELD OF INVENTION

This generally relates to USB devices and more particularly to virtualization of a USB device over a network.

BACKGROUND

USB (Universal Serial Bus) connections are commonly used to establish communication between devices and a host controller (usually personal computers). USB has replaced many varieties of serial and parallel ports, and can connect various computer peripherals such as mice, keyboards, digital cameras, printers, personal media players, flash drives, and external hard drives to a computer. For many of those devices, USB has become the standard connection method. USB was designed for personal computers, but it has become commonplace on other devices such as smartphones, PDAs and video game consoles, and as a power cord between a device and an AC adapter plugged into a wall plug for charging.

In another aspect of computing, systems exist to facilitate remote control of and access to a computer by an operator at a remote station. Such systems typically use a device or mechanism that enables an operator at a remote station to control aspects of a so-called target (or local) computer. More particularly, such systems typically allow a remote station to provide mouse and keyboard input to the target computer and further allow the remote station to view the video display output of the target computer. These types of systems are typically called keyboard-video-mouse (KVM) systems.

Remote KVM systems allow a user to interact with a computer anywhere in the world via the keyboard, mouse, and video, as if they were seated right next to the computer. In addition to virtualization of the keyboard, mouse and video, storage media such as CD/DVD-ROMs, flash drives, and floppy disks have also been virtualized. As such, a user can provide access to data on a disk to a server anywhere in the world.

Some conventional systems virtualize USB devices over a network. In such systems, a user may use a USB device connected to a remote computer as if it was connected to the local computer. Conventional USB-over-IP systems allow a user to use a USB device in one location while it is virtualized from a PC in another location and provide special software installed and running on the target computer to interact with a USB device. However, this software running on the target must be specifically tailored, requires greater overhead and infrastructure, and provides less flexibility. These products also require special software be installed on both the local PC and the remote PC. Installing software on the client PC may be acceptable, but installing it on the target PC is typically not as it may violate the security of the computer to be accessed.

The remote target computer does not typically have a USB connection to a local USB device without the installation of software on the target computer. Accordingly, there is a desire for a system that provides virtualization of USB device use while not requiring special software to do so.

SUMMARY

In accordance with methods and systems consistent with the present invention, a data processing system for virtualization of a USB device is provided, comprising a target computer configured to send and receive USB device data to a locally connected device, and a client computer locally connected to a USB device. The data processing also comprises a USB virtualization device locally physically connected to the target computer, configured to receive USB device data from the client USB device over the network, process the received USB device data, and send the processed USB device data to the locally connected target computer through a physical USB connection.

In one implementation, a USB virtualization device is provided, comprising a network interface configured to interact with a client computer to send USB device data and receive USB device data over a network. The USB virtualization device further provides a USB input/output interface configured to physically connect to a target computer in a USB port, and to receive USB data from the target computer and send USB device data to the target computer. The USB virtualization device also provides a processor configured to translate the received USB device data from the physical USB input/output interface for output to the network interface, and to translate the received USB device data from the network interface for output to the physical USB input/output interface.

In another implementation, a method in a data processing system for virtualization of a USB device is provided, comprising receiving USB device data from the USB device physically connected to a client computer, sending the received USB device data over a network, and receiving USB device data by a USB virtualization device from the client computer over the network. The method further comprises processing the received USB device data, and sending the processed USB device data to a target computer locally connected to the USB virtualization device through a physical USB connection.

BRIEF DESCRIPTION OF THE DRAWINGS

FIG. 4 illustrates a flowchart of exemplary steps of a method for USB device virtualization in a computer network in accordance with methods and systems consistent with the present invention

DETAILED DESCRIPTION

Figure 1:
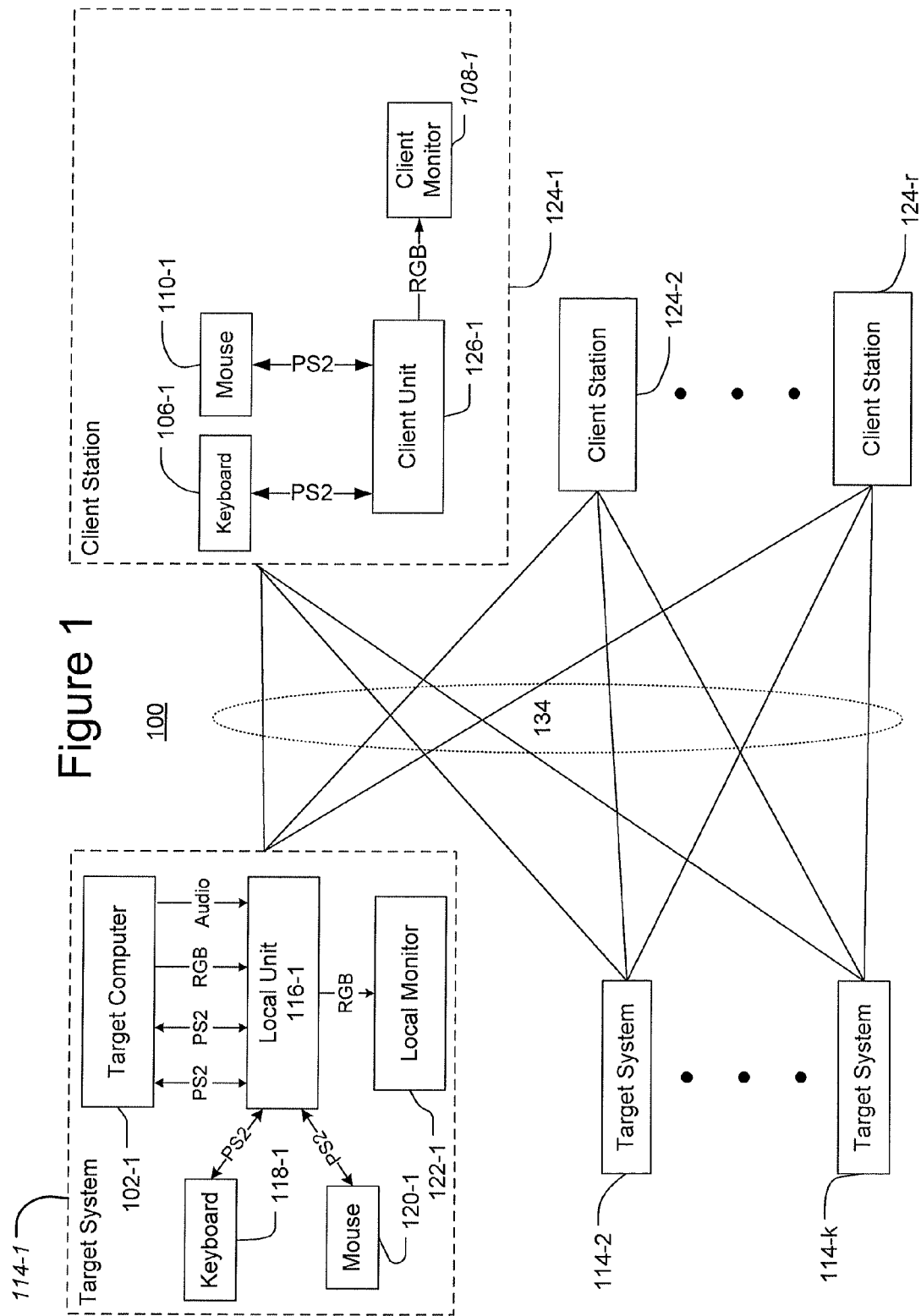
FIG. 1 illustrates an exemplary KVM computer system in accordance methods and systems consistent with the present invention.

Methods and systems in accordance with the present invention allow personal computer users to virtualize a local USB device so that they can remotely connect to a server and interact with the server as if the local USB device was physically connected to the server. They allow USB devices to be virtualized so that a remote user may attach their USB device to their local PC and then virtualize the USB device so that it can be used with a computer anywhere in the world. In one implementation, they connect a remote USB device virtualization hardware device to the target computer through a physical connection, such as a USB connection, and the device interacts with the local user's computer and USB device over a network. As such, the target system is unaware that the actual USB device is not connected directly to the system through a physical connection, and the target system does not need special software to implement the remote USB device. The USB target device connected to the target computer may be physically connected and disconnected, and the target computer interacts with the device as if it was the USB device, thereby avoiding the installation of special software on the target computer. In these systems, USB devices may be connected to a remote target computer without the target computer knowing that the USB device is not locally connected.

Methods and systems in accordance with the present invention do not require special software on a remote PC. Through the use of hardware device at the remote location, the connection to the remote PC may be through a normal USB device connection. The device driver and middle layer software for the USB device is typically already installed with the base operating system running on the remote PC. No more software is needed on the remote PC than would be required if a user connected a USB device directly to the remote PC. For the target system, the implementation over the network appears the same as a local USB device. For example, Windows or Linux is already configured to accept a plug in USB device, and do not require any additional software on the host or target. The operating system operates as if a physical USB is plugged into the target computer.

The lack of a need to have special software on the target computer provides the ability to be flexible, generic and used by a variety of clients and infrastructures with minimal infrastructure requirements. The target computer does not have to be a particular target or have particular software, and as a result, less overhead needs to be developed for implementation.

In the discussion that follows, the computer or system to which the USB device is being virtualized is generally referred to as the target computer or the target system. In some instances, the target computer is also referred to as the local computer, however, components local to the client computer may also be referred to as local. The system that is connected to the USB device to be virtualized is generally referred to herein as the client system.

FIG. 1 depicts an exemplary KVM computer system in accordance methods and systems consistent with the present invention. A KVM system 100 is shown in FIG. 1, where one or more target systems 114-1 . . . 114-k are controlled or accessed by one or more client stations 124-1, 124-2, . . . , 124-r (generally 124). Each target system 114 includes a target computer 102 with associated and attached local unit 116. Each client station 124 generally includes a client unit 126, a keyboard 106, a video monitor 108, and a mouse (or similar point-and-click device) 110, although some client stations may only include a video display 108 and a client unit. Operation of a particular target computer 102-i may be remotely viewed on the video monitor 108 of any of the client stations 124, and the keyboard 106 and mouse 110 of the client station 124 may be used to provide keyboard and mouse input to the target computer 102-i. As shown in FIG. 1, in a KVM system 100, a client station 124 is able to control or access more than one target computer. Note that the lines drawn between target systems and client stations in FIG. 1 represent potential (and not necessarily actual) wired or wireless (e.g., RF) links between those sides. Thus, each target computer 102 may be controlled or accessed by more than one client station 124, and each client station 124 may control more than one target computer 102. The client station 124, in one implementation, may be located within several hundred feet of the target system 114.

Furthermore, in certain contexts, the target system 114 is considered to be a video transmitter or sending unit, and the client system 112 is the video receiving unit or receiver, although both units transmit and receive. Generally, video travels from target system 114 to client station 124, while keyboard and mouse data move from client station to target system.

As shown in FIG. 1 the local or target system 114 includes a target computer 102 and an associated local unit 116. The local system 114 may also include a keyboard 118, a mouse (or other point-and-click-type device) 120 and a local monitor 122, each connected to the local unit 116 directly. The client station 124 includes a client unit 126. The local or target computer 102 may be a computer, a server, a processor or other collection of processors or logic elements. Generally, a target computer may include any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, on a manufacturing or processing production line. A collection of target computers 102 may be a collection of servers in a rack or some other collection, they may be independent of each other or connected to each other in a network or by some other structure. The local and client monitors 122, 108, may be digital or analog.

The local unit 116 is a device or mechanism, e.g., a printed circuit board ("PCB"), that is installed locally to the target/local computer 102. This device may be close to, but external to the computer, or may be installed inside the computer's housing. Regardless of the positioning of the local unit 116, in one implementation, there is a direct electrical connection between the target computer 102 and the local unit 116.

Various components on the local/target system 114 communicate wirelessly or via a wired connection with components on the client station 124 via a wireless connection link 134. In one implementation, the wireless connection or link 134 follows the IEEE 802.11 standard protocol, although one skilled in the art will realize that other protocols and methods of communication are possible.

The local unit 116 receives local mouse and keyboard signals, e.g., USB or PS2 signals. These signals are provided by the local unit 116 to the target computer 102. The target computer 102 generates video output signals, e.g., RGB (Red, Green, Blue) signals, which are provided to the local unit 116 which, in turn, provides the signals to drive the local monitor 122. The target computer 102 may also generate audio output signals which are provided to the local unit 116. As noted, the target computer 102 need not have a keyboard, mouse or monitor, and may be controlled entirely by a client station 124.

Local unit 116 transmits image data for transmission to a client station 124 (e.g., via client unit 126). Some or all of the data may be compressed before being transmitted. Additionally, local unit 116 may receive mouse and keyboard data (from a client station 124), which is then provided to the local/target computer 102. The target computer 102 may execute the data received and may display output on its local monitor 122.

The client station 124 receives video data from the local unit 116 of the target computer 102, via a wired or wireless connection (e.g., 802.11a wireless connection 134). The client unit 126 receives (possibly compressed) video data (not all of the data need be compressed) from the local unit 116. The client unit 126 decompresses (as necessary) the video data from the local unit 116 and provides it to the appropriate rendering device, e.g., to the client monitor 108, which displays the video data. Additionally, client mouse 110 and keyboard 106 may be used to generate appropriate signals (e.g., PS2 signals or USB) that may be transmitted via client unit 126 to local unit 116 for execution on target computer 102.

Figure 2:
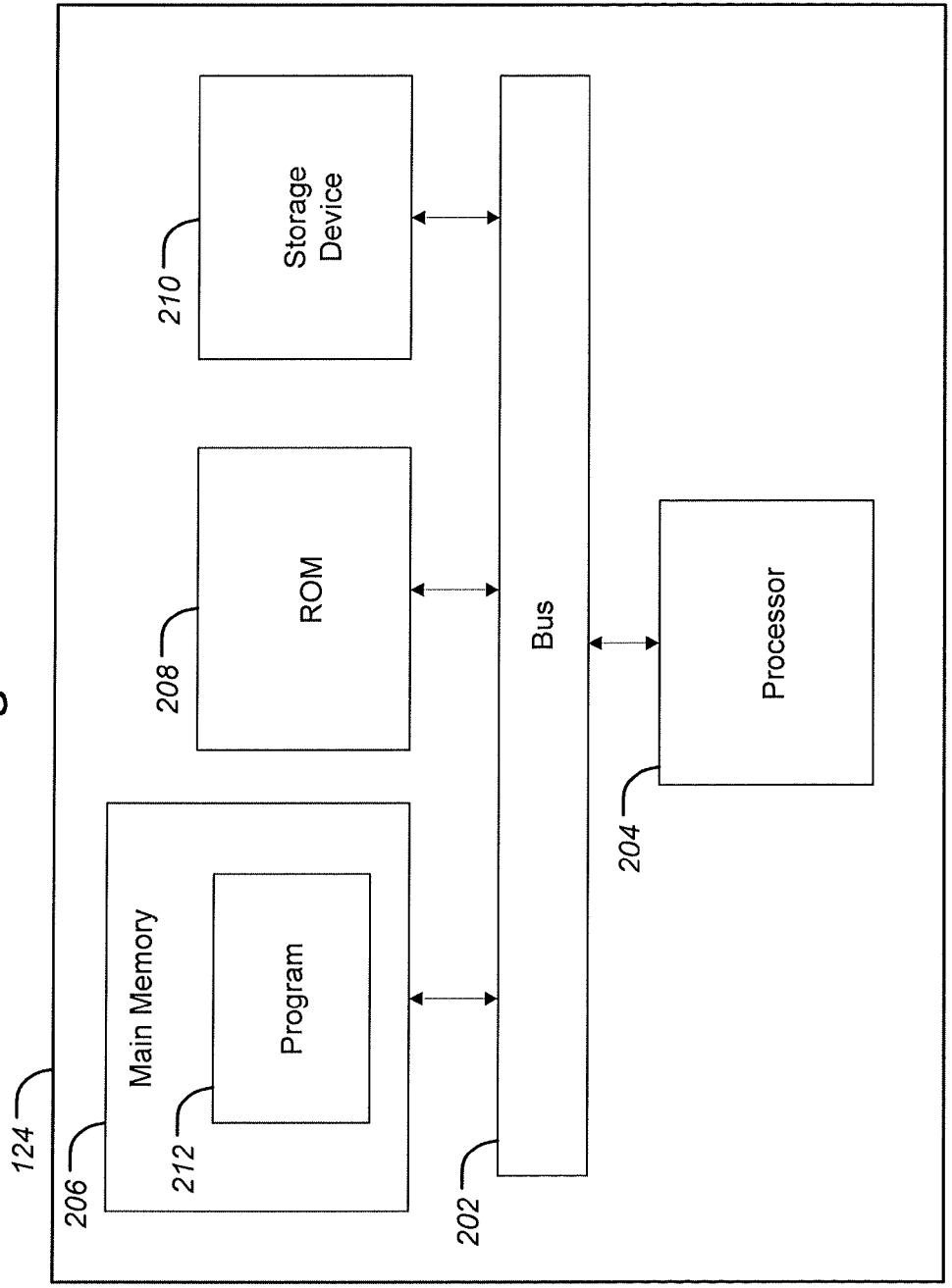
FIG. 2 illustrates an exemplary target computer system consistent with systems and methods consistent with the present invention.

FIG. 2 illustrates an exemplary client computer system consistent with systems and methods consistent with the present invention. Client computer 124 includes a bus 202 or other communication mechanism for communicating information, and a processor 204 coupled with bus 202 for processing the information. Client station 124 may also include similar components as client computer 124, including some or all of the components mentioned. Client computer 124 also includes a main memory 206, such as a random access memory (RAM) or other dynamic storage device, coupled to bus 202 for storing information and instructions to be executed by processor 204. In addition, main memory 206 may be used for storing temporary variables or other intermediate information during execution of instructions to be executed by processor 204. Main memory 206 includes a program 212 for implementing processing consistent with methods and systems in accordance with the present invention. Client computer 124 further includes a Read-Only Memory (ROM) 208 or other static storage device coupled to bus 202 for storing static information and instructions for processor 204. A storage device 210, such as a magnetic disk or optical disk, is provided and coupled to bus 202 for storing information and instructions.

According to one embodiment, processor 204 executes one or more sequences of one or more instructions contained in main memory 206. Such instructions may be read into main memory 206 from another computer-readable medium, such as storage device 210. Execution of the sequences of instructions in main memory 206 causes processor 204 to perform processes described herein. One or more processors in a multi-processing arrangement may also be employed to execute the sequences of instructions contained in main memory 206. In alternative embodiments, hard-wired circuitry may be used in place of or in combination with software instructions. Thus, embodiments are not limited to any specific combination of hardware circuitry and software.

Although described relative to main memory 206 and storage device 210, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Figure 3:
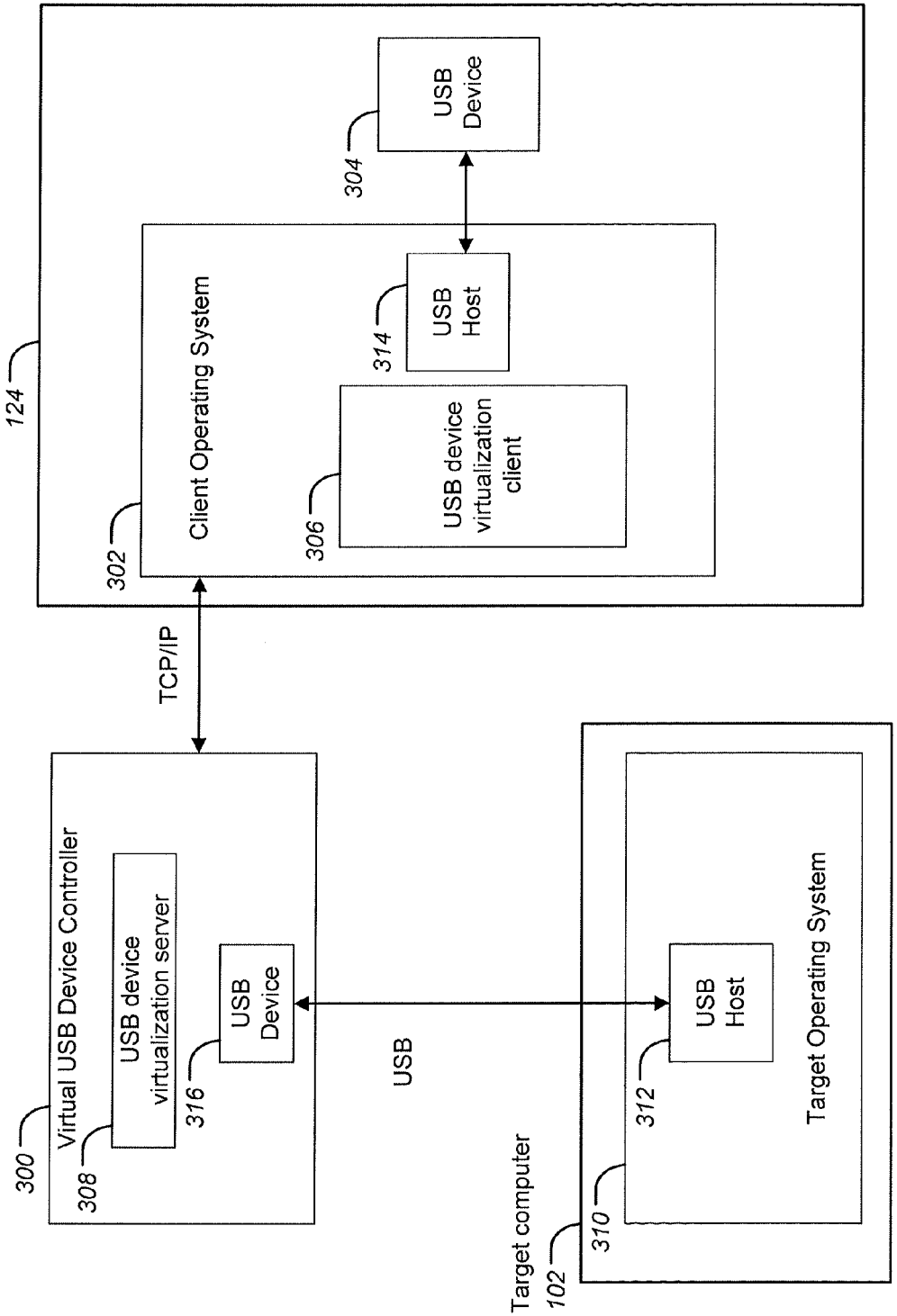
FIG. 3 depicts a USB virtualization device in a computer network in accordance with methods and systems consistent with the present invention.

FIG. 3 depicts a virtual USB device controller 300 in a computer network in accordance with methods and systems consistent with the present invention. As shown on the Figure, the client station 124 includes a client operating system 302 which may connect to external devices, e.g., USB devices 304 or any other suitable component. A client user plugs their USB device 304 into the USB input on the client station 124 so that it can interact remotely with the target computer 102.

The target operating system 310 on the target computer 102 may be a normal operating system. Further, the target computer 102 may include one or more USB connections and may connect to USB devices or any other suitable components.

The client operating system 302 also includes a USB device virtualization client component 306, which may be software on the client computer 124 which interacts with the remote target virtual USB device controller 300, which in one implementation, is a hardware device. The client computer 124 may download the USB device virtualization client component 306. The USB device virtualization client component 306 communicates with the USB device virtualization server 308 remotely over a network using TCP/IP, and interacts with the local USB device 304.

In one implementation, the virtual USB device controller 300 is a hardware component that includes the USB device virtualization server 308 which may be firmware, software, or hardware for interacting remotely with the USB device virtualization client component 306 and locally with the target computer 102 and target computer operating system 304. This virtual USB device controller 300 may be plugged into the target computer 102 with a physical connection, such as a USB connection. In one implementation, the USB device virtualization server 308 communicates with the USB device virtualization client component 306 in the Avocent Virtual USB Protocol (AVUP) developed by Avocent, Inc. However, other suitable protocols and methods are possible.

When the USB device 304 is plugged into the client system 124, it connects to a USB host 314 on the client system 124. The USB host may, for example, be a combination of hardware and software. At this point, the system may ask the user whether to use the USB device 304 locally or whether to redirect it to a remote target computer 102. When the USB device 304 is plugged in and the user has indicated virtualization of the device, the USB device virtualization client 306 sends a notification to the USB device virtualization server 308 that a new USB device 304 has been attached and that it is virtualizing the new USB device. In this notification, the USB device virtualization client 306 transmits the type of device it is, the number of endpoints (e.g., how many different types of functions it can perform) and begins a bi-directional flow of information including status and data and requests for status and data, pursuant to the USB protocol.

Upon receiving the notification of the new USB device 304, the USB device virtualization server 308 on the virtual USB device controller 300 plugged into the target computer 102 configures its USB device 316 that interfaces with the USB host 312 on the target computer. The USB device 316 may be a physical component that plugs into the USB jack on the target computer 102 and also comprises configurable software. The software on the USB device 316 is configured to emulate the USB device 304 that is being virtualized on the client computer 124. When signals are received from the USB device 304 on the client computer 124, this USB device 316 on the virtual USB device controller 300 emulates the signals received and sends those signals to the target computer 102 via the USB host 312. It also receives USB signals from the target computer 102 and sends them to the USB device 304 on the client computer 124 via the USB device virtualization client 306.

When the USB host 312 on the target computer 102 requests status, for example, the USB device virtualization client 306 responds back with the status. USB device virtualization client 306 may also inform the target computer 102 that it has data to send, and the target computer may respond to proceed with the transmission.

The virtual USB device controller 300 receives information for USB device interaction, such as USB device commands or packets, from the target operating system 310 and they are processed by the USB device virtualization server 308 on the virtual USB device controller 300. The USB device virtualization server 308 processes, translates and transmits the USB device commands in the AVUP protocol over TCP/IP to the USB device virtualization client component 306. The virtual USB device controller 300 includes a processor that runs USB device virtualization server software 308, and that processor may also have a USB device 316 built in. It uses a network connection to connect to the client computer 124, and a USB device connection to connect to the target computer 102. The virtual USB device controller 300 translates USB device commands and responses from the network format to the USB format and vice versa.

For example, the USB device virtualization server 308 receives the USB device command from the target computer 102, translates the command and sends it over TCP/IP to the USB device virtualization client component 306. The response to the USB device command traverses back from the USB device virtualization client component 306 to the USB device virtualization protocol server 308 on the virtual USB device controller 300, and through the physical USB connection to the target computer 102. In one implementation, the USB device commands may conform to the USB specification for USB devices 304.

On the client system 124, the USB device virtualization client component 306 uses services provided by the client operating system 302, such as the USB host 314, to send the USB device command out to the physical USB device 304 connected to the client computer.

FIG. 4 illustrates a flowchart of exemplary steps of a method for USB device virtualization in a computer network in accordance with methods and systems consistent with the present invention. First, a virtual USB device controller 300 is plugged into a target computer 102 via a physical connection (such as its USB device 316) and connects with the USB host 312 (step 402). The target operating system 310 recognizes the USB-connected virtual USB device controller 300 as a local USB device and operates accordingly (step 404). Additionally, a USB device 304 to be virtualized is plugged into the client computer 124 via the USB host 314 on the client computer (step 406). Upon prompting by the system, the user indicates that they would like the USB device 304 to be virtualized to the target computer 102 (step 408).

The USB device 304 attached to the client computer 124 interfaces with the USB host 314 which passes the USB device information to the USB device virtualization client component 306 (step 410). Initially, these commands may indicate the presence and identification of the device and may later include relevant status and data. Further, the USB device virtualization client component 306 processes the received USB device command and sends it via TCP/IP over the network to the USB device virtualization server 308 on the virtual USB device controller 300 (step 412). Then, the USB device virtualization server 308 translates the received USB device command to the USB format to be outputted to the target operating system 310 on the target computer 102 (step 414). The USB device virtualization server 308 also configures the USB device 316 on the virtual USB device controller 300 to emulate the USB device 304 locally connected to the client computer system 124 (step 416). The USB device 316 then sends the USB command information to the target operating system 310 via the USB host 312 to which it is connected (step 418).

The target operating system 310 may respond or initiate USB interaction by transmitting a USB device command, e.g, status or data request, over the USB connection to the virtual USB device controller 300 as it would to a physically connected local USB device 304 (step 420). Next, the USB device 316 on the virtual USB device controller 300 receives the USB device command and passes it to USB device virtualization server 308 (step 422). Furthermore, the USB device virtualization server 308 on the virtual USB device controller 300 receives the USB device command and translates it to a protocol used by the USB device virtualization server 308 and the USB device virtualization client component 306, such as the AVUP protocol (step 424).

The USB device virtualization server 308 transmits the translated USB device command over TCP/IP to the remote client computer 124 (step 426). The remote client computer's operating system 302 receives the translated USB device command and passes it to the USB device virtualization client component 306 (step 428) to translate it into USB to be outputted to the connected USB device 304.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A data processing system for virtualization of a USB device, comprising:
    a target computer configured to send and receive USB device data to a locally connected USB virtualization device;
    a client computer locally connected to a USB device; and
    the USB virtualization device locally physically connected and physically attached to the target computer such that the target computer interacts with the USB virtualization device as if the USB virtualization device were the USB device plugged in locally physically to the target computer, configured to:
        emulate the client USB device locally to the target computer;
        receive USB device data from the client USB device over a network;
        process the received USB device data; and
        send the processed USB device data to the locally connected target computer through a physical USB connection.

2. The data processing system of claim 1, wherein the USB virtualization device is further configured to:
    receive USB device commands from the locally connected target computer;
    process the commands to be transmitted over the network; and
    send the processed USB device commands to the client computer over the network.

3. The data processing system of claim 1, wherein the target computer interacts with the USB virtualization device in the same way the client computer interacts with the locally connected USB device.

4. The data processing system of claim 1, wherein all software for remote USB device interaction is on the USB virtualization device and the client computer.

5. The data processing system of claim 1, wherein the client computer is a KVM client that controls the target computer.

6. The data processing system of claim 1, wherein the client computer comprises a program configured to interact with the locally connected USB device and the USB vitualization device.

7. The data processing system of claim 1, wherein communications over the network are TCP/IP communications.

8. A USB virtualization device, comprising:
    a network interface configured to interact with a client computer to send USB device data and receive USB device data over a network from a USB device connected to the client computer;

a USB input/output interface configured to physically connect and physically attach to a target computer in a USB port, and to receive USB data from the target computer and send USB device data to the target computer, such that the target computer interacts with the USB virtualization device as if the USB virtualization device were the USB device plugged in locally physically to the target computer; and a processor configured to:

translate the received USB device data from the physical USB input/output interface for output to the network interface; and translate the received USB device data from the network interface for output to the physical USB input/output interface.

9. The USB virtualization device of claim 8, wherein the target computer interacts with the USB virtualization device in the same way the client computer interacts with a locally connected USB device.

10. The USB virtualization device of claim 8, wherein the client computer is a KVM client that controls the target computer.

11. The USB virtualization device of claim 8, wherein the client computer comprises a program configured to interact with the locally connected USB device and the USB virtualization device.

12. The USB virtualization device of claim 8, wherein the network interface communicates using TCP/IP.

13. The USB virtualization device of claim 8, wherein the USB virtualization device is a hardware device.

14. A method in a data processing system for virtualization of a USB device, comprising:

receiving USB device data from the USB device physically connected to a client computer;

sending the received USB device data over a network;

receiving USB device data by a USB virtualization device from the client computer over the network;

processing the received USB device data; and sending the processed USB device data to a target computer locally connected to the USB virtualization device through a physical USB connection such that the target computer interacts with the USB virtualization device as if the USB virtualization device were the USB device plugged in locally physically to the target computer.

15. The method of claim 14, wherein the USB virtualization device interacts with the target computer in the same way as a locally connected USB device.

16. The method of claim 14, wherein all software for remote USB device interaction is on the USB virtualization device and the client computer.

17. The method of claim 14, wherein the client computer is a KVM client that controls the target computer.

18. The method of claim 14, wherein the client computer comprises a program configured to interact with the locally connected USB device and the USB virtualization device.

* * * * *